Jan. 19, 1937.  F. P. ILLSLEY  2,067,924

PRESSURE RELIEF VALVE

Filed Oct. 24, 1932  3 Sheets-Sheet 1

Inventor:
Frank P. Illsley
By: Brown, Jackson, Boettcher & Dienner,
Attys.

Jan. 19, 1937.   F. P. ILLSLEY   2,067,924
PRESSURE RELIEF VALVE
Filed Oct. 24, 1932   3 Sheets-Sheet 3

Inventor:
Frank P. Illsley
By: Brown, Jackson, Boettcher & Dienner
Attys

Patented Jan. 19, 1937

2,067,924

UNITED STATES PATENT OFFICE 2,067,924

PRESSURE RELIEF VALVE

Frank P. Illsley, Muskegon, Mich.

Application October 24, 1932, Serial No. 639,317

10 Claims. (Cl. 137—53)

This invention relates to cooling systems for internal combustion engines, and has to do with a cooling system particularly adapted for use with automobiles and with a valve for use in such a system.

The use of a cooling system for an automobile engine, and which system is normally closed to the atmosphere, possesses numerous advantages over the cooling systems now in use and which are at all times open to the atmosphere. By having the cooling system closed to the atmosphere, loss of water or anti-freeze is prevented, the engine may operate at higher temperatures than with a normally open cooling system with resulting increase in efficiency, and the radiator may be of smaller capacity than in the normally open cooling system, thus effecting a saving in cost of the radiator. While a closed cooling system is preferable to a normally open cooling system, for the reasons noted, there are certain difficulties attendant upon the use of a closed system.

In a closed system considerable pressure may build up within the system, including the radiator, accompanied by an increase in temperature which may become sufficiently high to soften the solder of the joints, and under unfavorable conditions this pressure may become so great as to cause rupture of the radiator or blowing off of the hose connection. In order to limit the pressure to a safe maximum value, it is necessary to employ a relief valve. Relief valves of ordinary type are not suitable for this purpose, due to the small area of the valve exposed to the pressure within the system and to the relatively large area of contact between the valve and its seat. A relief valve used in a cooling system is subject to the liquid and vapors of the system and soon becomes fouled or corroded, with the result that the valve member sticks to its seat and will not open at the desired safe and predetermined maximum pressure. A further difficulty in using a closed system is that if the filler cap or equivalent member is removed for replenishing the water or liquid in the radiator when the system is under appreciable pressure, there is great danger of the person removing the cap being seriously scalded by water and steam blowing out through the filler neck or opening.

One of the main objects of my invention is to provide a thoroughly practical and highly efficient cooling system for internal combustion engines, particularly well suited for use with automobile engines, which system is normally closed to the atmosphere and is free of the above noted difficulties. A further object is to provide a valve for use in such a system, the valve having but slight area of contact between the valve member and the cooperating valve seat and being provided with a member subject to the pressure of the system and of great area relative to the valve member for opening the same, this valve assuring that the system will be opened to the atmosphere at the predetermined maximum pressure within the system. Further objects and advantages of my invention will appear from the detail description.

Figure 1:
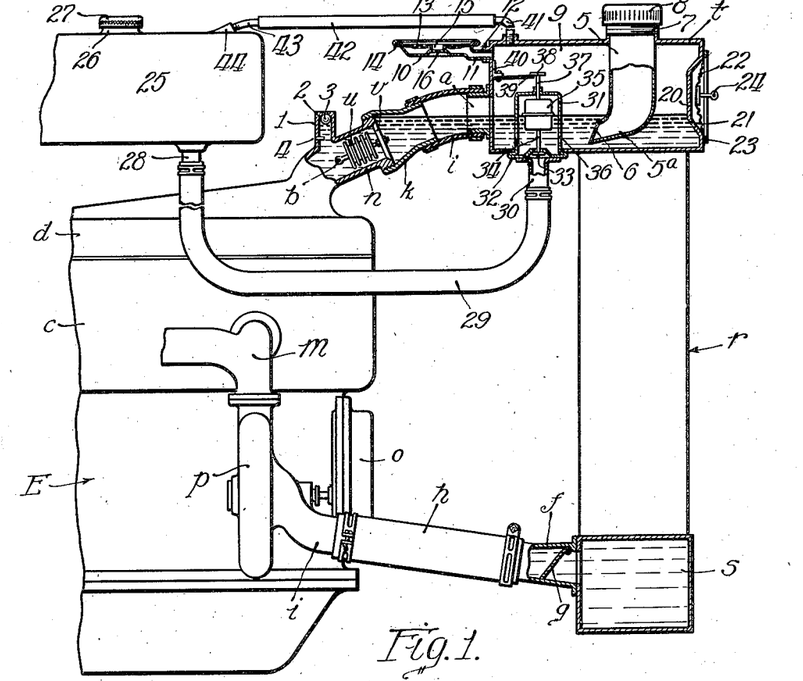
Figure 1 is a fragmentary side view of an internal combustion engine and a cooling system in accordance with my invention applied thereto, parts being shown in section.

I have illustrated the cooling system of my invention, by way of example, as applied to an internal combustion engine E which is of known construction and comprises a water jacketed cylinder block $c$ and a cylinder head $d$, also water jacketed. This engine has associated therewith a cooling system comprising a radiator $r$ which is, in general, of known construction and is provided with a top tank $t$ and a bottom tank $s$. Tank $s$ is provided with an outlet fitting $f$ in which is mounted a non-return valve g of known type. Fitting f is connected by a length of hose h to intake member i of a pump p, the discharge of which is connected by a manifold m to the cylinder block c. This pump may be driven in any suitable manner, and is shown as being driven from the timing gearing o of the engine. An outlet neck n extends from the head d and has a reducer k suitably mounted on its outer end, this reducer being connected by a length of hose l to an inlet fitting a of the top tank t and opening thereinto. The pump p serves to produce circulation of the water or cooling liquid through the cooling system in a known manner.

Neck n is suitably shaped, at its upper end, to provide a seat for a disc valve v operated by a bellows thermostat u, the lower end of which is suitably secured at b in neck n. The valve v and the bellows-thermostat u are properly proportioned to balance the pressure so that the valve is controlled by temperature only. The valve v serves to close the upper or outer end of neck n until the water or cooling liquid of the engine jacket reaches a predetermined temperature sufficiently high to assure proper starting and operation of the engine. The valves g and v cooperate to segregate the portion of the cooling system therebetween from the radiator, so that relatively high pressures, with resulting increase in temperature, can be built up in the system between these two valves without subjecting the radiator to objectionably high pressures and temperatures.

Neck n is provided with an offset forming a valve chamber 1 in which is mounted a ball float valve 2 which controls a vent opening 3 in the top of chamber 1. Downward movement of valve 2 in the chamber is limited by a pin 4 projecting into the lower end of the chamber. When the cooling system is properly filled with cooling liquid, valve 2 occupies the position of Figure 1 and closes opening 3 to the atmosphere. In this figure the cooling liquid is at the normal level therefor when the engine is hot.

When the engine cools down, with corresponding cooling off of the cooling system, the cooling liquid in the system falls materially below the level thereof shown in Figure 1, and a partial vacuum may be produced in the cooling system. Under such conditions, valve 2 will be lowered so as to uncover the opening 3 and admit air therethrough into the system to satisfy the partial vacuum produced.

It is desirable, particularly in a closed cooling system, that an expansion space be provided to accommodate the expansion of the cooling liquid when heated and the vapors generated by heating of the liquid. The tank t is provided with a filling tube 5, the lower portion of which is bent laterally at 5a to define an opening normally closed by a flap valve 6 pivoted at its upper edge to the tube 5. The tube 5 is secured through the top wall of the radiator so as to form therewith a fluid-tight and pressure-resistant closure. A threaded collar 7 is secured about the upper portion of tube 5 and receives a closure cap 8 which screws onto the collar and forms therewith, and with the upper end of the tube, a fluid-tight and pressure-resistant closure. The filling tube serves to limit the height to which the tank t can be filled by liquid introduced through the tube 5 and assures that an adequate expansion space 9 is provided above the liquid in the tank. It will be understood that the level of the liquid shown in Figure 1 is approximately the maximum height to which the water or like cooling liquid introduced through the tube 5 will rise when the engine is cold. After the engine has been in operation for a considerable time, the water or cooling liquid in the system becomes heated and expands so that the expansion space will be correspondingly smaller than the space shown in Figure 1.

A cup-shaped valve casing 10 is mounted at the back of radiator tank t and communicates therewith through a nipple 11 extending from the casing and secured in a collar 12 defining an opening through the back wall of the tank. The top of casing 10 is closed by a circular diaphragm 13 of resilient metal, brass being suitable for this purpose. The edge portion of this diaphragm is tightly secured in a bead 14 formed by turning down the edge portion of casing 10 so as to form a fluid-tight and pressure-resistant closure between the edge of the diaphragm and the casing. The main portion of the diaphragm is depressed so as to fit into the upper portion of casing 10 and be held thereby in concentric relation to the casing. This diaphragm is preferably provided with a plurality of concentric corrugations extending about a valve element 15 of annular shape and defining a circular outlet opening at the center of the diaphragm. Conveniently, the element 15 is formed by turning down the center portion of the diaphragm as shown. The valve element seats upon the upper flat face of a valve seat member 16 extending upwardly from the casing 10 centrally thereof, this seat member being formed integral with the casing. Diaphragm 13 acts, by its inherent resiliency, to normally hold valve element 15 in edgewise contact with the flat seat of member 16 so as to form therewith a fluid-tight closure. The under side of diaphragm 13 is of much greater area than the outlet opening or port defined by the valve element 15 and is subjected to the pressure within expansion space 9, that is, to the pressure within the cooling system. Since member 15 has edge contact with valve seat member 16, the area of contact between these members is quite small and does not provide lodgment for foreign materials contained in the cooling liquid, nor is the area of contact of sufficient extent to render possible sticking together of the valve and the valve seat due to corrosion.

Normally, the cooling system is completely closed or sealed to the atmosphere. In the operation of the engine, the cooling liquid is heated and vapors are evolved so that pressure is built up within the system and, consequently, within the space 9 and the valve casing 10. The pressure exerted by the diaphragm 13 may be such that the valve member 15 starts to move away from the seat member 16 when a definite and predetermined pressure exists within the cooling system. It will be understood that the pressure at which the valve starts to open may be varied within limits, according to the particular system with which the valve is to be used. Ordinarily, I find that a valve which will start to open at a pressure of approximately five pounds within the cooling system is suitable for most systems. This pressure is not often attained and the cooling system remains closed to the atmosphere, under ordinary conditions, except at such time as undesirable overheating of the system may occur with resulting increase in the vapors generated in the expansion space. Under such conditions, the pressure in the expansion space and exerted against the under face of diaphragm 13, serves to raise the valve member 15 so as to vent the expansion space to atmosphere, when the pressure within the space reaches the predetermined maximum value.

The diaphragm 13 is so made as to have a very rapid natural period of vibration. When valve member 15 is raised from the seat 16, a small amount of vapor escapes to the atmosphere with a resultant slight drop in pressure beneath the diaphragm 13 which acts to immediately return valve member 15 to its seat, this member being then again raised by the pressure which builds up the required extent instantaneously, this vibration of the member 15 continuing during escape to the atmosphere of the vapors, that is, during the time that the pressure within the expansion space exceeds the permissible maximum. In consequence of the escaping vapor, the diaphragm 13 and the member 15 are vibrated at high speed and produce a whistling noise of high pitch and which is very penetrating. The valve thus serves as an audible signal to notify the operator of the automobile that the supply of liquid in the cooling system needs replenishment. Since the cooling system is normally closed to the atmosphere, no vapors escape therefrom under ordinary conditions, so that there is no loss of cooling liquid or of anti-freeze mixed with the liquid. The closed system is of particular advantage in conserving volatile anti-freeze, such as alcohol, and also has the advantage of eliminating loss of cooling liquid due to evaporation, splashing or the like, the only loss of liquid from the system, under ordinary conditions, being due to such leakage as may occur through connections and stuffing boxes. The use of a closed cooling system thus has the advantage that it is necessary to replenish the cooling liquid only occasionally and not quite frequently as in the ordinary type of cooling systems now commonly used and normally open to the atmosphere.

As clearly shown in Figure 1, the effective cross area of the nipple or conduit 11 through which fluid under pressure is admitted from the top tank of the radiator into the valve casing, is not in excess of, and preferably somewhat less than, the effective cross area of the outlet opening 15 of diaphragm 13. In all of the forms of the valve illustrated, the effective cross area of the outlet opening is at least equal to the effective cross area of the opening or conduit for admitting fluid under pressure into the valve casing, as clearly shown in the drawings. This is advantageous in that it eliminates possibility of building up, within the valve casing, of a pressure of such high value as to move the diaphragm in opening direction an excessive distance such as to impart to the diaphragm a permanent set such as would hold the valve member carried by the diaphragm in open position, thus establishing permanent communication between the interior of the cooling system and the atmosphere. This condition might result from having the inlet opening for admitting pressure fluid into the valve casing of an effective cross area greater than the effective cross area of the outlet opening and, for this reason, it is important that the effective cross area of the outlet opening be at least equal to, and preferably greater than, the effective area of the inlet opening or conduit for admitting pressure fluid into the valve casing.

The filling tube 5 and the flap valve 6, in addition to limiting the extent to which liquid poured into the radiator can rise, also effectively prevents the possibility of scalding of the driver of the automobile, or of an attendant, due to incautious removal of the closure cap of the filling tube. If there be appreciable pressure within the cooling system, this pressure is effective to close the valve 6 so as to prevent escape of contents of the system through tube 5 upon removal of cap 8. When the tube 5 is filled with water or cooling liquid, if the pressure exerted on valve 6 from within tank t is greater than the pressure exerted by the column of liquid in the tube 5, the valve 6 remains closed until the pressure within the tank is less than the pressure exerted by the column of liquid in tube 5, at which time there is no danger of the water or cooling liquid being forcibly ejected out of tube 5 by the pressure within the tank.

The accumulation of pressure within the cooling system permits of the water or cooling liquid being heated to a higher temperature than would otherwise be possible so that the engine operates at a higher temperature than with a cooling system normally open to the atmosphere. This has the advantage of decreasing the fuel consumption of the engine with resulting increase in efficiency thereof from the standpoint of fuel consumption. The pressure built up in the closed cooling system may be utilized for operating mechanisms associated with the cooling system, such as shutters, which are commonly employed for regulating the flow of air through the radiator for cooling the water therein. For this purpose I provide a depression in the front wall of tank t, which depression constitutes a pocket 20 communicating with the interior of the tank through an opening 21. A diaphragm 22 of suitable material is secured to the front wall of the tank by a securing ring 23, or in any other suitable manner, and provides a movable wall closing the outer side of the pocket. A connecting member 24 is suitably secured to the diaphragm 22, centrally thereof, this member being adapted for connection to a suitable mechanism, such as shutters, disposed adjacent the radiator. It will be understood that the diaphragm 22 may be employed for operating any suitable mechanism exterior of the radiator.

It is desirable that the liquid in the cooling system be replenished from time to time to compensate for cooling liquid which may be lost by leakage or by escape of vapor to the atmosphere through the valve, though loss from the latter cause is extremely slight under ordinary conditions. A supply tank 25 is suitably supported in such manner that the bottom of this tank is above the normal liquid level in the radiator tank t. This tank is provided with a filling neck 26, normally closed to the atmosphere by a screw cap 27. An outlet nipple 28 extends from the bottom of tank 25 and is connected by a length of hose 29 to a nipple 30 opening into the lower end of a float chamber 31 within the top radiator tank t. Nipple 30 is secured to the under face of bottom wall 32 of float tank 31, which bottom wall is provided with an inlet opening controlled by a valve 33 carried at the lower end of a stem 34 depending from a float 35 in float chamber 31, which chamber communicates through openings 36 with the interior of tank t. A stem 37 extends through the upper end of float tank or chamber 31 and carries, at its upper end, a disc head 38. A bimetallic thermostat strip 39 has its inner end disposed beneath head 38, the outer end of this strip being secured to a bracket 40 secured to the inner face of the back wall of tank t. An elbow 41 is secured through the top wall of tank t and opens into the expansion space 9. This elbow is connected by a length of hose 42 to a fitting 43 which screws into a boss 44 opening through the top of tank 25. When the engine is cold, the thermostat strip 39 holds the head 38 in its uppermost position, thus holding the valve 33 seated and preventing entry of cooling liquid into tank $t$ through nipple 30. After the engine has been operated for an appreciable time and the cooling system has been heated to the proper operating temperature, strip 39 becomes bowed downward so as to release the head 38 and, under such conditions, if the level of the liquid in tank 9 falls below the level of Figure 1, valve 33 opens and admits sufficient liquid from tank 25 to restore the liquid level in tank $t$. It is desirable that this replenishment of the liquid in the cooling system occur when the system is at operating temperature, since, if additional liquid were admitted to the system when cold, the expansion of this additional liquid when heated might result in increasing the pressure in expansion space 9 to an undesirable extent, thus causing premature opening of the relief valve and the loss of more or less liquid rather than vapor only. In this connection it is noted that the pressure at which the relief valve opens bears an approximate relation to the operating temperature of the engine, as above pointed out. While I preferably provide the tank 25 and associated parts for automatically replenishing the liquid supply in the cooling system, this is not essential and these parts may be omitted if desired. Also, if desired, the valves $v$ and 2, and associated parts, may be omitted, as well as the valve $g$.

Figure 2:
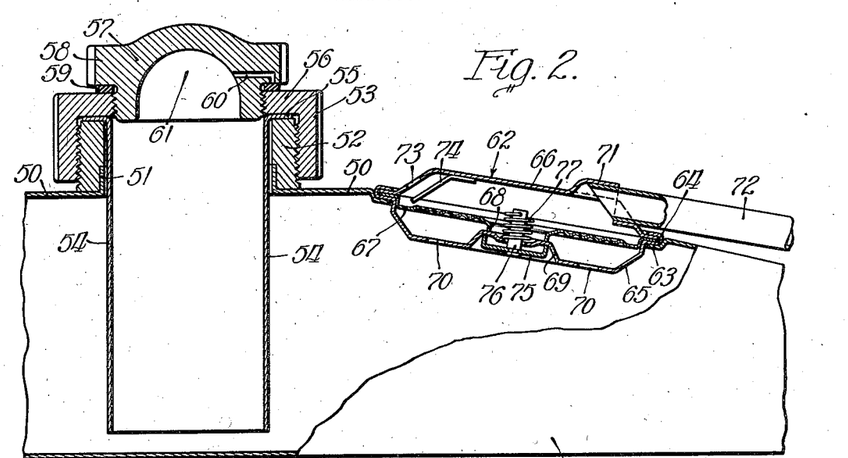
Figure 2 is a fragmentary sectional view through the top tank of a radiator and the valve of my invention applied thereto, illustrating a modified form of my invention.

In the form of my invention illustrated in Figure 2, top wall 50 of the tank $t$ is provided with a filler opening defined by a collar 51. A threaded ring 52 is secured about the collar 51 so as to form a fluid-tight and pressure-resistant closure therewith. Ring 52 receives a flange nut 53 which screws thereon. A cylindrical filling tube 54 extends through ring 52 and downwardly within tank $t$ to within a short distance of the bottom wall thereof. This tube is provided, at its upper end, with an outwardly extending flange 55 which is tightly clamped between the upper face of ring 52 and flange 56 of nut 53, so as to provide a fluid-tight and pressure-resistant closure about the flange of the tube. Flange 56 of nut 53 is interiorly threaded for reception of a threaded closure cap 57 screwing into flange 56, this cap having an outer flange 58 which seats upon a gasket 59 confined between flanges 56 and 58 so as to form a fluid-tight and pressure-resistant closure therebetween. Preferably, flange 55 of tube 54 is suitably secured to flange 56 of nut 53. By removing nut 53 the tube 54 may be removed so that there is no air trapped in tank $t$ which may then be filled more quickly than when tube 54 is in place. The cap 57 is provided with an L-shaped duct 60 extending from a central cavity 61 in the under face of the cap and opening through the under face of flange 58. Normally, the outer end of duct 60 is sealed by the gasket 59. If the cap 57 is screwed out of flange 56 for a short distance, the outer end of duct 60 is moved out of contact with gasket 59 and the duct then serves to vent any pressure within the tube 54 to the atmosphere. This serves as a warning that appreciable pressure exists within the tank $t$ and the cap 57 should not be removed until the pressure within the tank has dropped to atmospheric pressure, or approximately so, which can be determined by the velocity of the air or vapor escaping through the duct 60.

Top wall 50 of the tank is provided with an opening which accommodates a valve structure 62, quite similar to the valve structure of Figure 1, wall 50 being depressed about this opening to provide a flange 63 forming a seat for bead 64 of valve structure 62. This valve structure comprises a lower casing section 65 of cup-like shape, and an upper casing section 66, also of cup-like shape. A metal diaphragm 67 extends across the casing section 65, the main or body portion of this diaphragm being slightly depressed so as to fit into section 65 in centered relation thereto. The edge portion of diaphragm 67 constitutes a flange element which extends between the casing sections 65 and 66, which sections are secured tightly together by the bead 64 formed by turning downwardly and inwardly the peripheral portion of casing section 65. In this manner the two sections of the casing are secured tightly together and the edge portion of the diaphragm is clamped tightly between the casing sections so as to form therewith a fluid-tight and pressure-resistant closure extending about the circumference of the valve casing. The diaphragm 67 is formed of resilient sheet metal, preferably brass or bronze, and is preferably provided with a plurality of concentric corrugations as shown.

The diaphragm is pierced centrally and is turned downwardly to provide an annular valve member 68 defining a circular outlet opening. This member 68 is quite thin, being of the same thickness as the diaphragm 67, and has edge contact with a flat valve seat provided by a seat member 69 extending inwardly from the central portion of casing section 65 and conveniently formed integral therewith. The diaphragm 67 normally acts, by its inherent resiliency, to hold valve member 68 against the seat of member 69 so as to form a fluid-tight closure therewith. Casing section 65 communicates with the expansion space in tank $t$ through openings 70 in the lower wall of section 65, or in any other suitable manner. Section 66 of the valve casing is provided with an outwardly offset element 71, in which is secured a tube 72 opening to atmosphere at a suitable location. This section 66 may also be provided with an opening 73 to atmosphere, in front of which, within section 66, and suitably secured thereto, is disposed a baffle member 74.

The area of the diaphragm 67 exposed to the pressure within the tank $t$ is much greater than the area of the outlet opening or port defined by the valve element 68, and, since this element has edge contact with the seat of member 69, there is no possibility of the valve sticking closed due to corrosion or other causes. When the pressure within the cooling system reaches the predetermined maximum, the pressure exerted against the under face of diaphragm 67 lifts the valve member 68 from its associated seat, thus venting the tank $t$ to atmosphere and producing an audible signal of high pitch and which can readily be heard by, and will immediately attract the attention of, the driver of the automobile.

When the cooling system cools off, after the engine has been in operation for a considerable time, a partial vacuum will be produced within the tank $t$, due to condensing of the vapors therein. Under certain conditions, it may be desirable to relieve this partial vacuum. For this purpose, I provide a cup valve 75 which normally seats accurately in valve seat member 69, at the under face thereof. This cup-valve 75 is tightly secured to a pin 76 having a loose sliding fit through member 69. An expansion coil spring 77 is mounted about pin 76 and bears, at its lower end, on the upper face of member 69, the upper end of this spring being suitably secured to the pin. Under normal conditions, the cup valve 75 remains in closed position. If a partial vacuum is produced within the tank t, air flows through tube 72 into casing section 66 and thence about the pin 76 so as to cause opening of cup valve 75, by atmospheric pressure exerted upon the upper face thereof, thus permitting air to flow into the tank t until the partial vacuum therein has been satisfied, or approximately so, it being understood that the spring 77 merely serves to raise the valve 75 into seating position and does not exert any considerable pressure for holding this valve closed. After the partial vacuum within the tank t has been satisfied, the valve 75 returns to its normal or closed position.

In Figure 2, bead 64 of the valve 62 is soldered or otherwise secured in the depression defined by the downwardly bent flange or element 63 of wall 50.

Figures 3, 4:
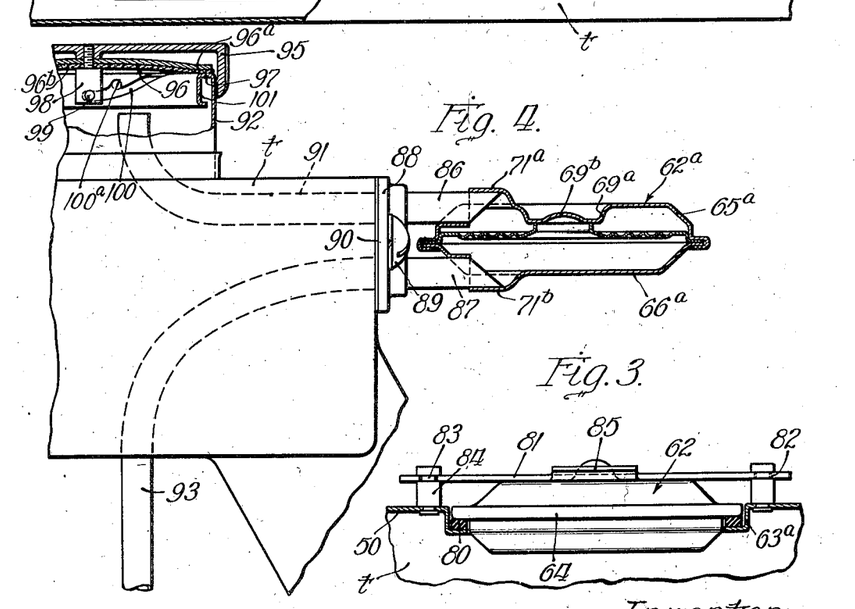
Figure 3 is a fragmentary sectional view through the top wall of the top radiator tank illustrating a modified form of mounting for the valve.
Figure 4 is a fragmentary side view of the top tank of a radiator, partly broken away and in section, illustrating a second modification of my invention.

In Figure 3 wall 50 is provided with a depressed element 63a of approximately L-shape in vertical section, this element defining a circular recess for reception of bead 64 of valve 62 and a horizontal flange upon which seats a gasket 80. Bead 64 seats upon the gasket and the valve is held tightly in position by a pressure bar 81 provided adjacent its ends with oppositely directed notches 82 which engage about reduced necks 83 of headed studs 84 riveted or otherwise suitably secured to wall 50 at opposite sides of element 63a, the studs being in alignment diametrically of valve 62. Bar 81 serves to hold the valve 62 in position and exerts sufficient pressure thereon to assure a fluid-tight and pressure-resistant closure about bead 64 of the valve. Preferably bar 81 is provided with an extension 85 constituting a grip for convenience in removal and replacement of the bar. In the form of Figure 3, the valve 62 can be removed and replaced with facility. Otherwise, the construction and operation of the valve is similar to that of the valve shown in Figure 2.

In Figure 4 the valve 62a is of quite similar construction to the valve of Figure 2, but is reversed relative thereto and the lower casing section 66a is provided with an offset element 71b disposed in the vertical plane of element 71a of the upper casing section 65a. Valve seat member 69a is shaped slightly differently than in Figure 2 and is provided with a central upwardly extending and rounded element or depression 69b. With the exceptions noted, the construction and operation of valve 62a is similar to that of valve 62, it being noted, however, that the air inlet valve 75 and associated parts, and the baffle 74 of valve 62, are omitted from valve 62a.

Nipples 86 and 87 are suitably secured in offsets 71a and 71b of the casing of valve 62a, respectively, these nipples also being secured, at their outer ends, in a mounting plate 88 secured by screw means 89, or in any other suitable manner, to the back wall of upper radiator tank t, a gasket 90 being disposed between this wall and the plate 88. Nipple 86 communicates with a tube 91 which extends upwardly into filling neck 92 of the radiator and nipple 87 communicates with an outlet tube 93 which extends to the exterior of the radiator and is open to the atmosphere at a suitable location. The diaphragm of valve 62a is subject to the pressure within the tank t, by means of tube 91 and nipple 86 and, when this pressure reaches a predetermined maximum, the valve opens and vents the tank to atmosphere through nipple 87 and tube 93. The valve serves as an audible signal in the manner previously described.

Filler neck 92 is normally closed by a cap 95 at the under face of which is disposed a concaved disc 96 which seats flat upon a flange 97 formed by the turned-in upper end portion of neck 92. The disc 96 comprises an upper metal disc 96a and a lower disc 96b of fiber or rubber and which forms a fluid-tight closure with flange 97. The cap 95 is provided with a plurality of lugs depending therefrom, one of which is shown at 98. Each of these lugs is provided with a pin 99 disposed to engage into a bayonet slot 100 formed in a flange 101 depending from the inner edge of flange 97. When the cap is in full closed position, the metal disc 96a is placed under tension and forces the disc 96b tightly against flange 97 so as to form therewith a fluid-tight and pressure-resistant closure. The cap and the filler neck are, in general, of known construction and need not be illustrated nor described in greater detail. It is pointed out, however, that I provide each of the bayonet slots 100 with an upwardly extending recess 100a adapted for reception of pin 99. If there is appreciable pressure within the tank t, when the cap 95 is turned in opening direction and through a short distance, pin 99 engages into recess 101, due to the pressure exerted on the under face of disc 96, and stops opening of cap 95. This serves as a warning that there is appreciable pressure within the tank t and notifies the automobile driver or attendant that the cap 95 should not be completely removed without first relieving the pressure in the tank. The depending flange of cap 95 fits loosely about neck 92 and, with the cap turned sufficiently to engage pin 99 into recess 101, disc 96 is raised slightly from the upper face of flange 97 so that the tank t is vented between neck 92 and the depending flange of cap 95. This serves as a further warning that the cap should not be removed until the pressure within the tank t has been reduced to atmospheric pressure, or substantially so, which can be determined readily by the velocity of the vapor being vented or the cessation of flow of vapor out of the tank.

Figure 5:
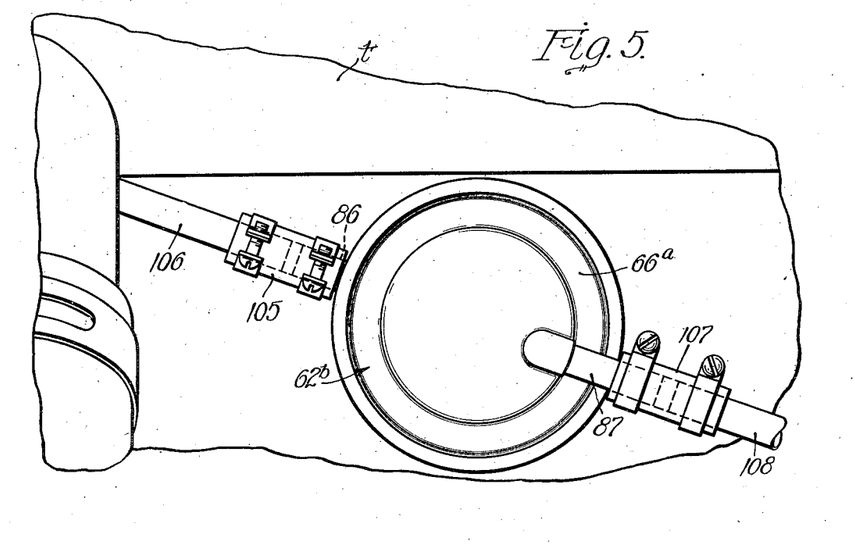
Figure 5 is a fragmentary back view of a radiator and associated parts illustrating a third modification of my invention.

In the modification illustrated in Figure 5, the valve 62b is similar to the valve 62a of Figure 4 and need not be illustrated nor described in detail. Nipple 86, which enters the casing beneath the diaphragm and at the valve seat side thereof, it being noted that valve 62b is disposed vertically, is connected by a short length of hose 105 to a tube 106 opening into tank t and corresponding to the usual overflow tube commonly used in cooling systems normally open to the atmosphere, such as ordinarily used. Nipple 87, which leads from the outlet side of the diaphragm, is connected by a short length of hose 107 to a vent tube 108. Valve 62b is thus, in effect, connected into the ordinary overflow tube used for a cooling system normally open to the atmosphere, which provides means for applying the valve with facility and expedition to a cooling system of ordinary type and thereby converting said system into a closed cooling system.

Figure 7:
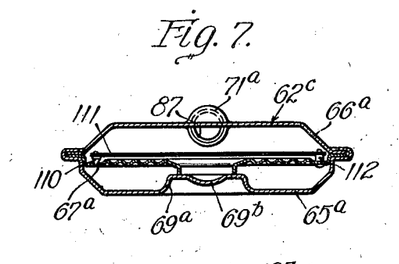
Figure 7 is a central vertical sectional view through a modified form of valve embodying thermoresponsive air venting means.

Valve 62c of Figure 7 is similar to valve 62b of Figure 5, with the exception that diaphragm 67 is provided with an air inlet opening 67a controlled by a needle valve 110 carried by a bimetallic thermostat strip 111, at one end thereof, this strip being secured, at its other end, at 112, to the diaphragm. At ordinary operating temperatures, valve 110 is closed and the main valve 62c operates in the manner previously described.

If the cooling system cools down to a temperature such as to create a partial vacuum therein, the thermostat strip 111 acts to open valve 110, admitting air from tube 87 and casing section 66a through opening 67a and thence through casing section 65a to tank t, and also acts as a pressure vent to vent to the atmosphere air displaced from the tank by expansion of the liquid in the preliminary warming up of the system.

Figure 8:
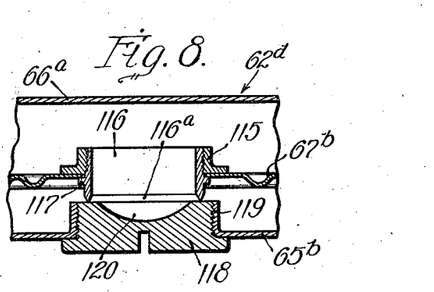
Figure 8 is a fragmentary vertical sectional view, on an enlarged scale, of a second modified form of valve structure.

In the modified form of valve 62d shown in Figure 8, a collar 115, of angle section, seats upon and may be secured to the upper face of diaphragm 67b, this collar being interiorly threaded for reception of an exteriorly threaded annular valve member 116 which screws into the collar and is provided with a circumferential shoulder 117 which bears against the under face of diaphragm 67b. The diaphragm is thus clamped tightly between collar 115 and shoulder 117, valve member 116 being thus secured to the diaphragm for movement therewith. At its lower portion, member 116 is beveled from the opposite sides thereof to provide an element 116a of reduced thickness and which has edge contact with a flat valve seat at the upper end of a screw plug 118 screwing into an interiorly threaded collar 119 extending upwardly from lower casing section 65b. This plug 118 is provided, in the upper end thereof, with a central depression 120 corresponding to element 69b of valve 62c. By removing plug 118, access may be had to the valve chamber and the valve seat and member for cleaning, repair or replacement. The depression 120 is curved to conform in shape to the segment of a sphere so that particles of foreign materials, which might otherwise tend to collect upon the flat upper face of plug 118, and which enter the depression 120, are swept from this depression by vapors or gases passing between member 116 and seat member 118 and thence through the outlet port defined by member 116. Similarly, in valve 62c of Figure 7, element 69b provides a rounded depression from which particles of foreign materials are readily swept by vapors flowing under pressure into and through the valve member.

Figure 9:
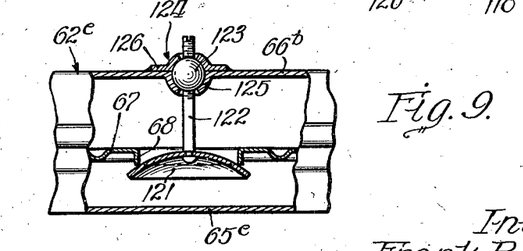
Figure 9 is a fragmentary elevation, partly broken away and in section, illustrating a third modified form of valve structure.

In the modified form of valve 62e, shown in Figure 9, a valve seat member 121 is supported from the top wall of upper casing section 66b by a pin 122 which screws through a ball 123 rockably mounted in a spherical socket structure 124 defined in part by element 125 of wall 66b and by member 126 secured to the upper face of this wall. Valve seat member 121 is of dished cross-section, being shaped to correspond to the segment of a sphere, and presents a rounded upper face which has edge contact with valve element 68 of diaphragm 67. This renders the valve seat member and the associated valve element self-cleaning and effectively eliminates possibility of sticking together thereof due to corrosion or collection of foreign materials therebetween. By turning pin 122, the valve seat member may be adjusted relative to the valve element 68 so as to set the valve to operate at any desired pressure, within limits. The ball mounting of pin 122 permits of swinging movement of valve seat member 121 so that this member is self-aligning relative to valve element 68, thus assuring proper contact between this element and its coacting seat member.

Figure 6:
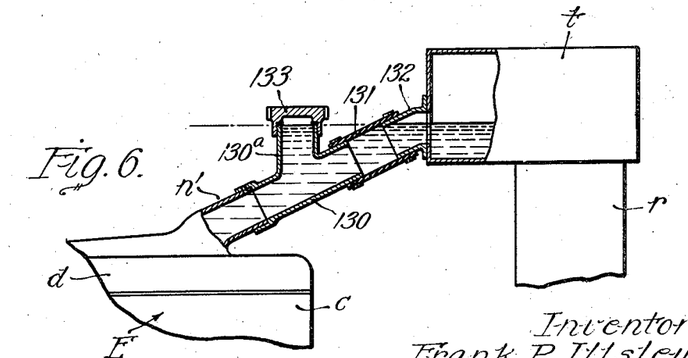
Figure 6 is a fragmentary side view of an engine and a radiator illustrating a second modified form of means for filling the cooling system.

In Figure 6 I have illustrated an additional modified form of means for filling the cooling system. An outlet neck n' extends from head d of the engine and is connected, at its upper end, to a T fitting 130. The upper end of fitting 130 is connected by a short length of hose 131 to an inlet fitting 132 secured to, and opening into, top tank T of the radiator r. Neck 130a of fitting 130 is closed by a screw cap 133. The fitting 130 is so disposed that the upper end thereof is in the plane of the desired liquid level within the tank T. This assures that liquid introduced into the system through neck 130a cannot extend above the desired level therein.

If desired, instead of having the thermostatically controlled vent valve mounted on the diaphragm of the main valve, as in Figure 7, the valve casing may be provided with an opening to atmosphere at the valve seat side of the diaphragm, this opening being controlled by a thermostatically actuated valve for admitting air to the radiator to prevent the formation of an objectionable degree of vacuum therein. If desired, any suitable supplemental means may be provided for optionally closing the vent opening independently of the thermostatically operated valve so as to prevent escape of vapors through this opening, or entry of air through the vent opening, at all times or as conditions may require. Furthermore, the vent opening referred to may be suitably positioned to prevent freezing of the main valve, in that it may be disposed to drain moisture from the main valve casing.

In addition to the filler neck or filler tube closure means above referred to, I also contemplate providing a closure for the filler neck, which closure is urged closed by yieldable means permitting displacement thereof for introducing cooling liquid into the system. In the event of there being appreciable pressure within the radiator tank or cooling system, this pressure will be effective to hold the closure member tightly seated and to prevent opening thereof except by the exertion of unusual pressure thereon.

Various means may be employed for maintaining a proper expansion space within the cooling system, preferably within the top tank of the radiator, though the means herein disclosed are preferable. The maintenance of this expansion space is desirable as rendering available air or vapor for discharge through the relief valve, upon opening of the latter, thus assuring operation of this valve in proper manner to produce the audible signal above referred to.

As above indicated, and as will be understood by those skilled in the art, various changes in construction and arrangement of parts of my invention may be resorted to without departing from the field and scope of the same, and I intend to include all such variations, as fall within the scope of the appended claims, in this application in which the preferred forms only of my invention are disclosed.

What I claim is:—

1. In combination in a valve of the character described, a casing, a resilient metal diaphragm extending across the casing and forming a fluid-tight closure therewith, a valve member carried by the diaphragm and defining an outlet opening, and a self-aligning valve seat member presenting a rounded valve seat, the diaphragm being of materially greater area than said opening and normally acting to urge the valve member into edge contact with the seat member to form therewith a fluid-tight closure, the seating edge of the valve member being substantially equal in thickness to the thickness of the diaphragm, said casing having an opening for admitting thereto and at the valve seat side of the diaphragm fluid under pressure.

2. In combination in a valve of the character described, a casing, a resilient metal diaphragm extending across the casing and forming a fluid-tight closure therewith, a valve member carried by the diaphragm and defining an outlet opening, a valve seat member having a rounded valve seat cooperating with the valve means, means for supporting the seat member for self-alignment with the valve member and for adjusting said seat member toward and away from said valve member, the diaphragm being of materially greater area than said opening and normally acting to urge the valve member into edge contact with the seat member to form therewith a fluid-tight closure, the seating edge of the valve member being substantially equal in thickness to the thickness of the diaphragm, said casing having an opening for admitting thereto and at the valve seat side of the diaphragm fluid under pressure.

3. In a safety pressure relief valve, a casing, a resilient metal diaphragm secured in said casing extending thereacross and forming a fluid tight closure therewith, said diaphragm being provided with an integral turned down portion defining a central outlet opening and constituting an annular valve element of but slight length relative to the diameter of the diaphragm, the wall thickness of said valve element being approximately equal to the thickness of said diaphragm, said casing being open to the atmosphere at one side of the diaphragm and having an inlet opening at the other side of said diaphragm, and a valve seat member at said other side of said diaphragm, the inherent resiliency of said diaphragm normally holding said valve element seated upon said seat member and forming a fluid tight closure therewith, said outlet opening and said inlet opening being relatively so proportioned that the effective area of the outlet, when the valve element is moved away from the seat member by corresponding movement of the diaphragm within its elastic limit, is at least equal to the effective area of the inlet.

4. In a safety pressure relief valve, a casing, a resilient metal diaphragm secured in said casing extending thereacross and forming a fluid tight closure therewith, said diaphragm being provided with an integral turned down portion defining a central outlet opening and constituting an annular valve element of but slight length relative to the diameter of the diaphragm, the wall thickness of said element being approximately equal to the thickness of said diaphragm, said casing being open to the atmosphere at one side of the diaphragm and having an inlet opening at the other side of said diaphragm, and a valve seat member at said other side of the diaphragm, the inherent resiliency of said diaphragm normally holding said valve element seated upon said seat member and forming a fluid tight closure therewith.

5. In a safety pressure relief valve, a structure in the form of a casing substantially circular in plan, the maximum length of said structure in the direction of its axis being materially less than its radius, a resilient metal diaphragm secured in said casing extending thereacross and forming a fluid tight closure therewith, two cooperating valve members adjacent one side of the casing, one defining an outlet opening and the other controlling said opening, one of said members being carried by the diaphragm centrally thereof and normally held seated by the inherent resiliency of said diaphragm upon the other member and forming a fluid tight closure therewith, said diaphragm being otherwise free for movement away from said other valve member, and nipples secured to and opening directly into the casing at the opposite sides and remote from the center thereof.

6. In a safety pressure relief valve, a structure in the form of a casing substantially circular in plan, the maximum length of said structure in the direction of its axis being materially less than its radius, a resilient metal diaphragm secured in said casing extending thereacross and forming a fluid tight closure therewith, two cooperating valve members adjacent one side of the casing, one defining an outlet opening and the other controlling said opening, one of said members being carried by the diaphragm centrally thereof and normally held seated by the inherent resiliency of said diaphragm upon the other member and forming a fluid tight closure therewith, said diaphragm being otherwise free for movement away from said other valve member, and nipples secured to and opening directly into the casing at the opposite sides and remote from the center thereof, said nipples extending substantially parallel to said casing.

7. In a safety pressure relief valve, a casing, a resilient metal diaphragm secured in said casing extending thereacross and forming a fluid tight closure therewith, and two cooperating valve members adjacent one side of the casing, one defining an outlet opening and the other controlling said opening, one of the members being carried by the diaphragm centrally thereof and seating upon the other member, said casing being open to the atmosphere at said side thereof and being provided at its other side with an inlet opening for connection to a source of fluid under pressure in vaporous or gaseous form, said diaphragm having a natural period of vibration of high frequency whereby a distinctive audible signal of high pitch is produced upon escape of fluid under pressure through said outlet opening with resultant vibration of said diaphragm, the diaphragm normally acting by its inherent resiliency to hold the valve member carried thereby seated upon the other valve member and forming a fluid tight closure therewith thereby preventing escape of the fluid except when the pressure thereof exceeds a safe value predetermined by the resistance of the diaphragm to the pressure of the fluid.

8. In a safety pressure relief valve, a casing provided with an inlet opening and an outlet opening, a resilient metal diaphragm secured in said casing extending thereacross and forming a fluid tight closure therewith, two cooperating valve members disposed adjacent one side of said diaphragm and controlling said outlet opening, one of said valve members being carried by and movable with the diaphragm, said inlet opening being disposed at said side of said diaphragm, said diaphragm having a natural period of vibration of high frequency whereby a distinctive audible signal of high pitch is produced upon escape of fluid under pressure through said outlet opening with resultant vibration of said diaphragm, the diaphragm normally acting by its inherent resiliency to hold the valve member carried thereby seated upon the other valve member and forming a fluid tight closure therewith thereby preventing escape of fluid except when the pressure thereof exceeds a safe value predetermined by the resistance of the diaphragm to the pressure of the fluid.

9. In a safety pressure relief valve, a casing provided with an inlet opening and an outlet opening, a resilient metal diaphragm secured in said casing extending thereacross and forming a fluid tight closure therewith, two cooperating valve members disposed adjacent one side of said diaphragm and controlling said outlet opening, one of said valve members being carried by and movable with the diaphragm, said inlet opening being disposed at said side of said diaphragm, said diaphragm having a natural period of vibration of high frequency whereby a distinctive audible signal of high pitch is produced upon escape of fluid under pressure through said outlet opening with resultant vibration of said diaphragm, the diaphragm normally acting by its inherent resiliency to hold the valve member carried thereby seated upon the other valve member and forming a fluid tight closure therewith thereby preventing escape of fluid except when the pressure thereof exceeds a safe value predetermined by the resistance of the diaphragm to the pressure of the fluid, movement of said diaphragm in opening direction being unlimited except for the resistance thereof to such movement, the effective area of said outlet opening, when the diaphragm has been moved from its normal valve closing position to valve opening position, being at least equal to the effective area of said inlet opening thereby preventing distortion of said diaphragm in opening direction beyond its elastic limit.

10. In a safety pressure relief valve, a casing provided with an inlet opening and an outlet opening, a resilient metal diaphragm secured in said casing extending thereacross and forming a fluid tight closure therewith, two cooperating valve members disposed adjacent one side of said diaphragm and controlling said outlet opening, one of said valve members being carried by and movable with the diaphragm, said diaphragm normally acting by its inherent resiliency to hold the valve member carried thereby seated upon the other valve member and forming a fluid tight closure therewith thereby preventing escape of fluid except when the pressure thereof exceeds a safe value predetermined by the resistance of the diaphragm to the pressure of the fluid, movement of said diaphragm in opening direction being unlimited except for the resistance thereof to such movement, the effective area of said outlet opening, when the diaphragm has been moved from its normal valve closing position to valve opening position, being at least equal to the effective area of said inlet opening thereby preventing distortion of said diaphragm in opening direction beyond its elastic limit.

FRANK P. ILLSLEY.